Dec. 11, 1951 W. W. HAMBY 2,578,242

METHOD OF TUFTING

Filed May 24, 1948 8 Sheets-Sheet 1

Inventor
WALTER W. HAMBY

By [signature]

Dec. 11, 1951 W. W. HAMBY 2,578,242

METHOD OF TUFTING

Filed May 24, 1948 8 Sheets-Sheet 2

Inventor
WALTER W. HAMBY

By [signature]

Dec. 11, 1951

W. W. HAMBY 2,578,242

METHOD OF TUFTING

Filed May 24, 1948

8 Sheets-Sheet 3

Inventor
WALTER W. HAMBY

By

Dec. 11, 1951 W. W. HAMBY 2,578,242

METHOD OF TUFTING

Filed May 24, 1948 8 Sheets-Sheet 4

Inventor
WALTER W. HAMBY

By [signature]

Dec. 11, 1951

W. W. HAMBY 2,578,242

METHOD OF TUFTING

Filed May 24, 1948

8 Sheets-Sheet 5

Inventor
WALTER W. HAMBY

By B. P. Fishburne, Jr.

Inventor
WALTER W. HAMBY

By B.F. [signature]

Inventor
WALTER W. HAMBY

By [signature]

Inventor
WALTER W. HAMBY
By [signature]

Patented Dec. 11, 1951 2,578,242

UNITED STATES PATENT OFFICE 2,578,242

METHOD OF TUFTING

Walter W. Hamby, Greensboro, N. C., assignor of one-fifth to Isaac C. Adams, Dalton, Ga.

Application May 24, 1948, Serial No. 28,923

2 Claims. (Cl. 112—79)

My invention relates to a method of tufting.

An important object of the invention is to provide a method of producing spaced tufts, simulating hand-made candlewick work, and for retaining the legs of the U-shaped tufts of equal length, whereby the work will have an even and attractive appearance.

Figure 1:
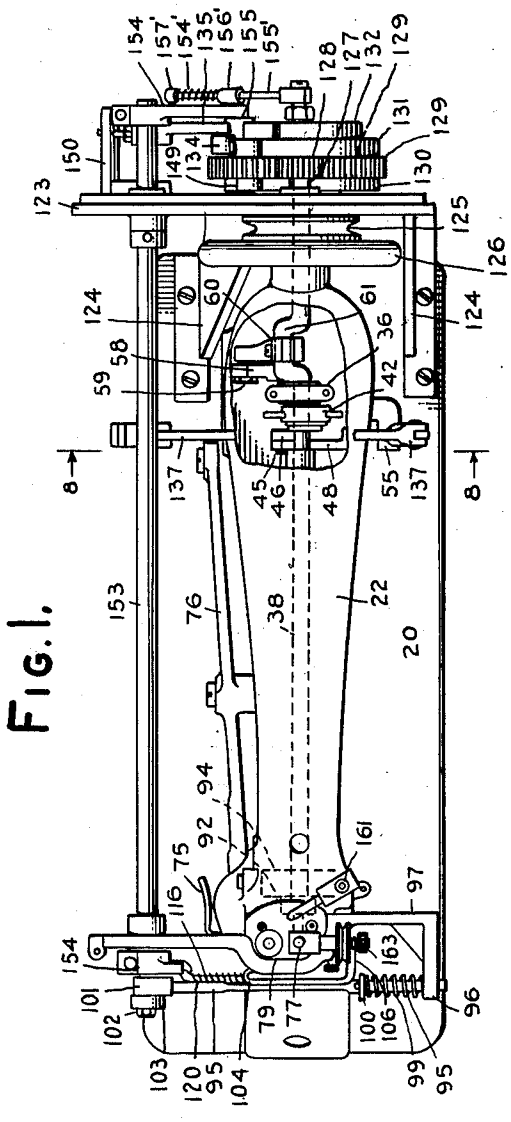
Figure 10:
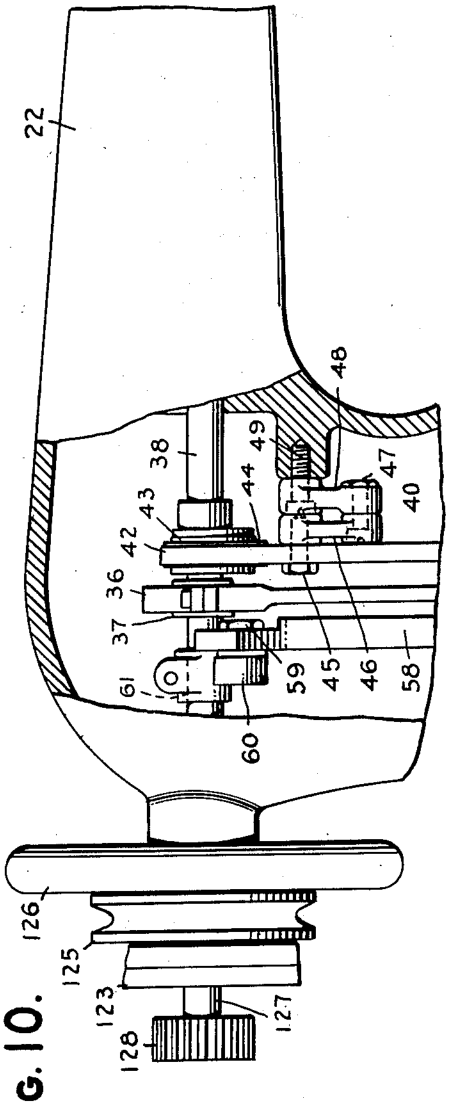
Figure 2:
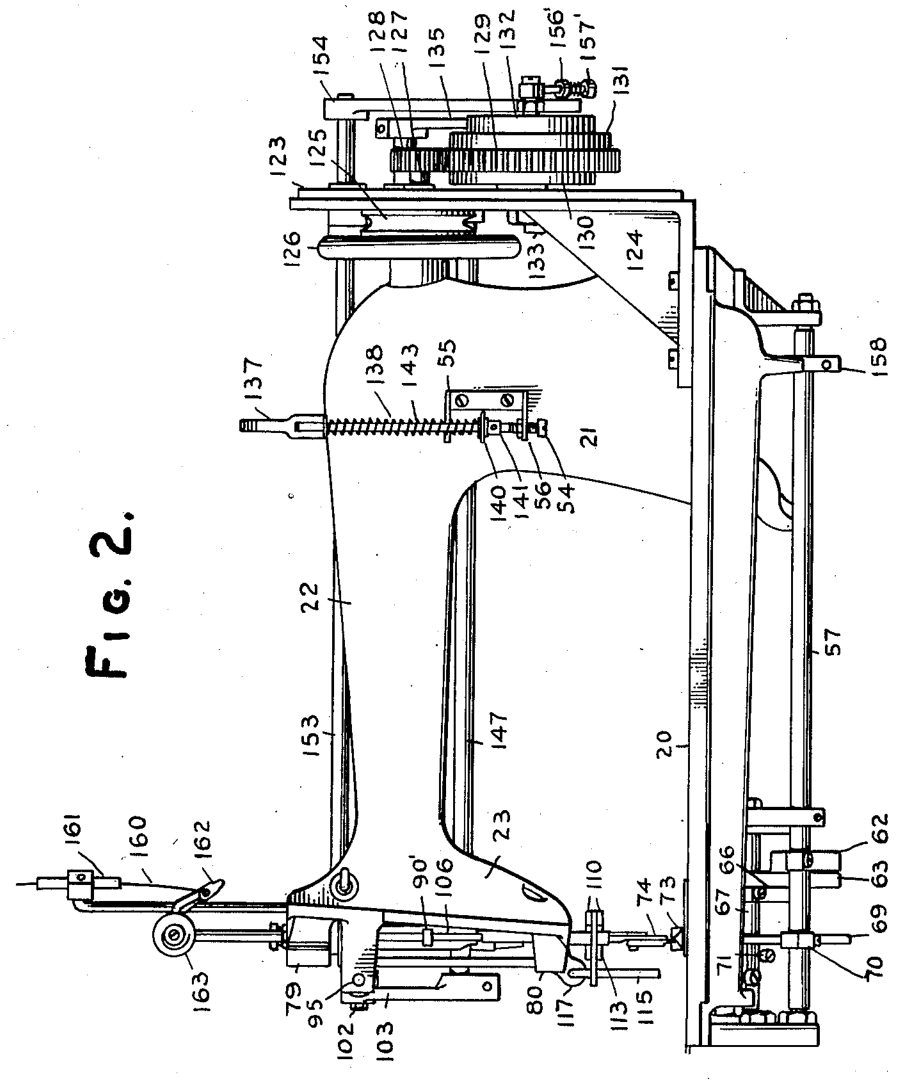
Figure 3:
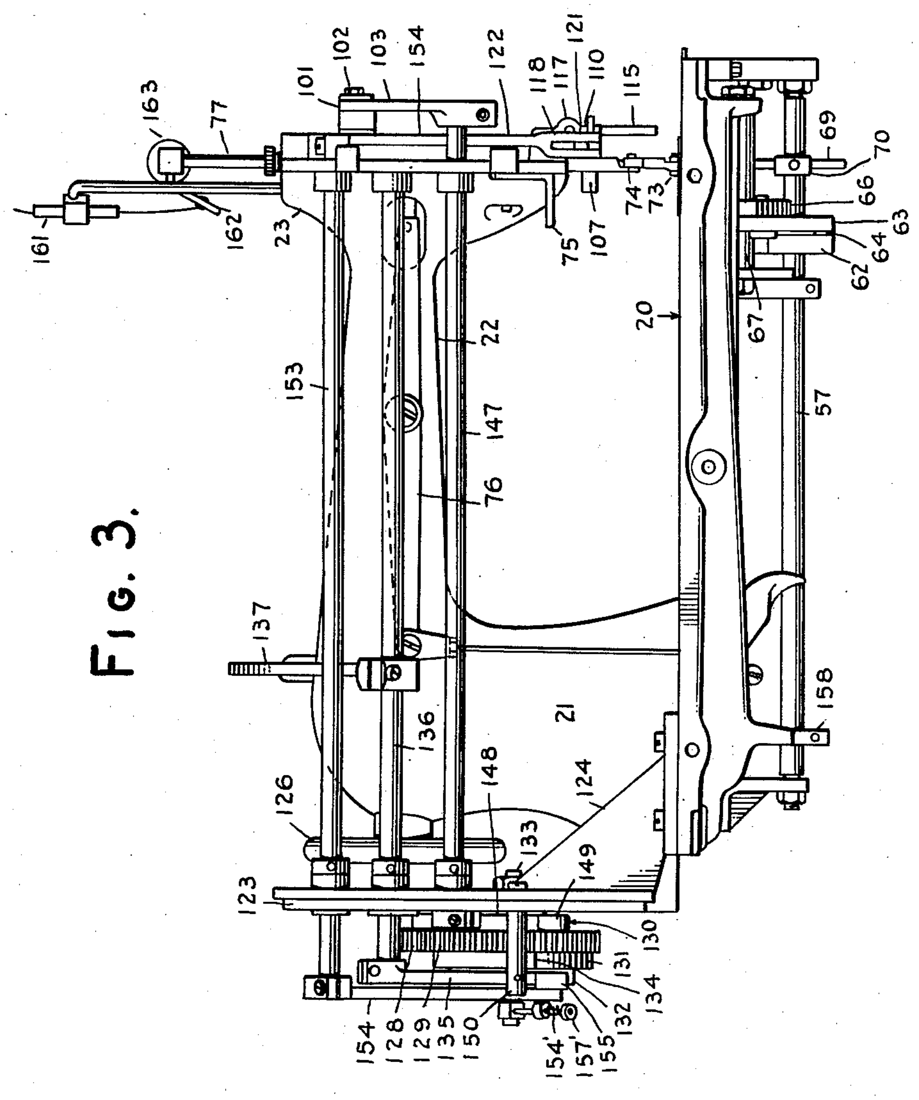
Figure 4:
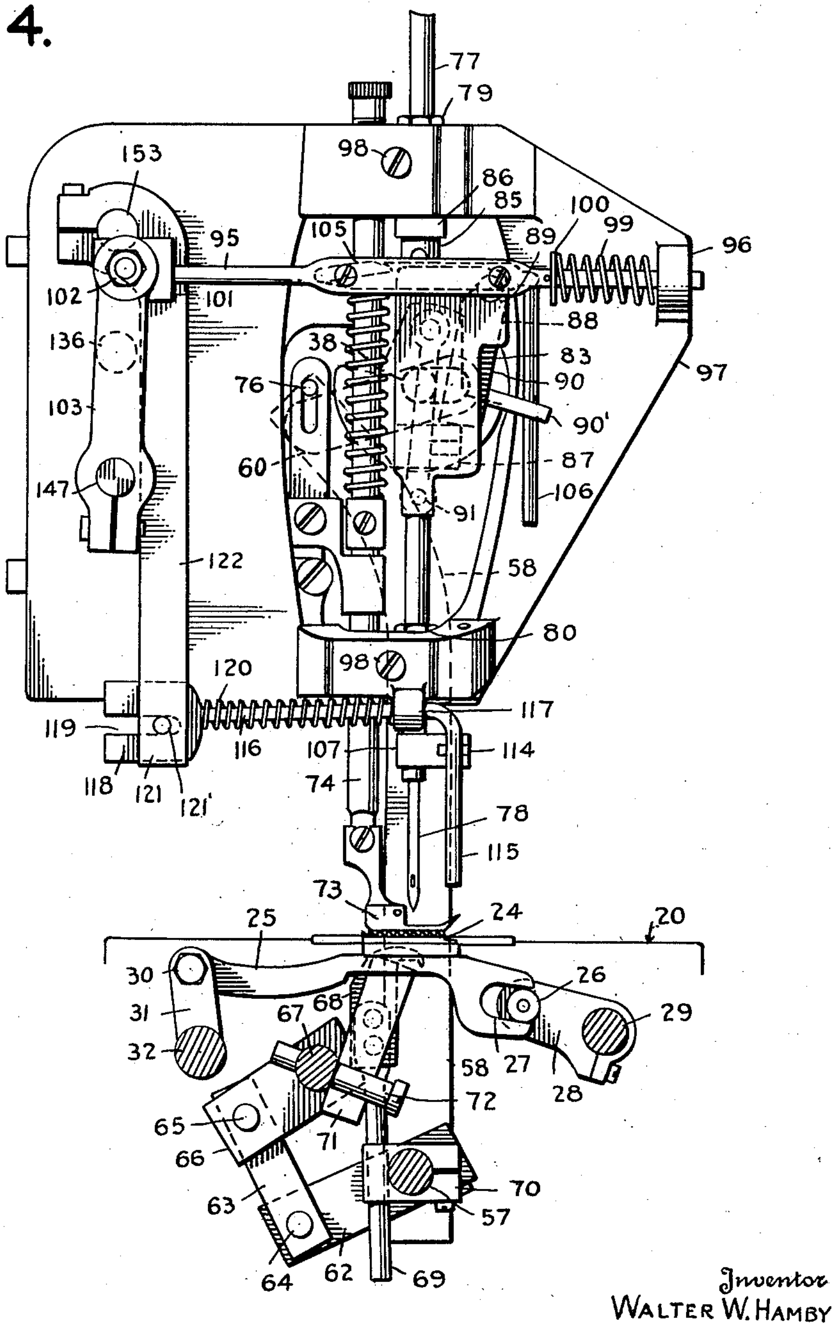
Figures 5, 6, 7, 10A:
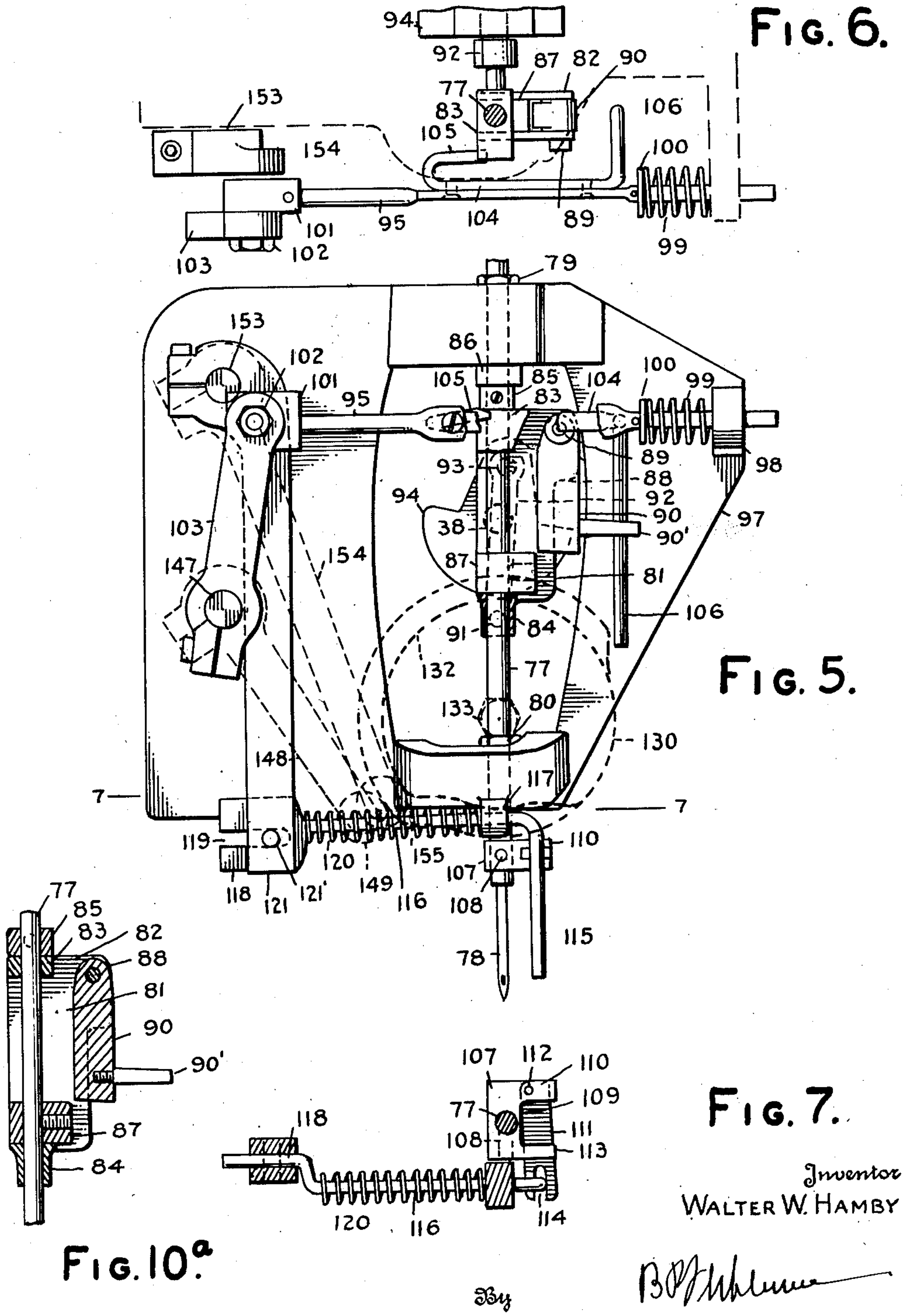
Figure 8:
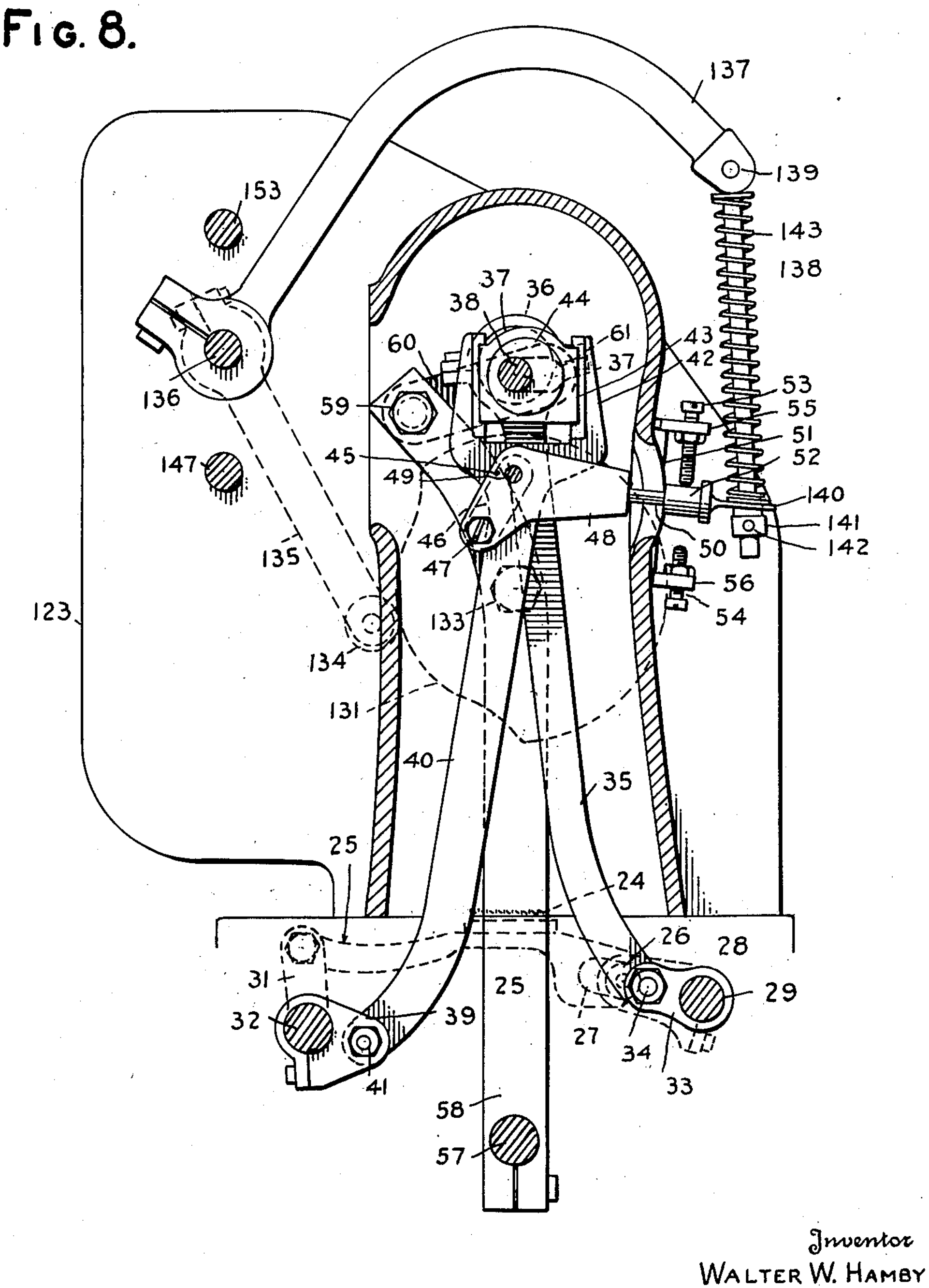
Figure 9:
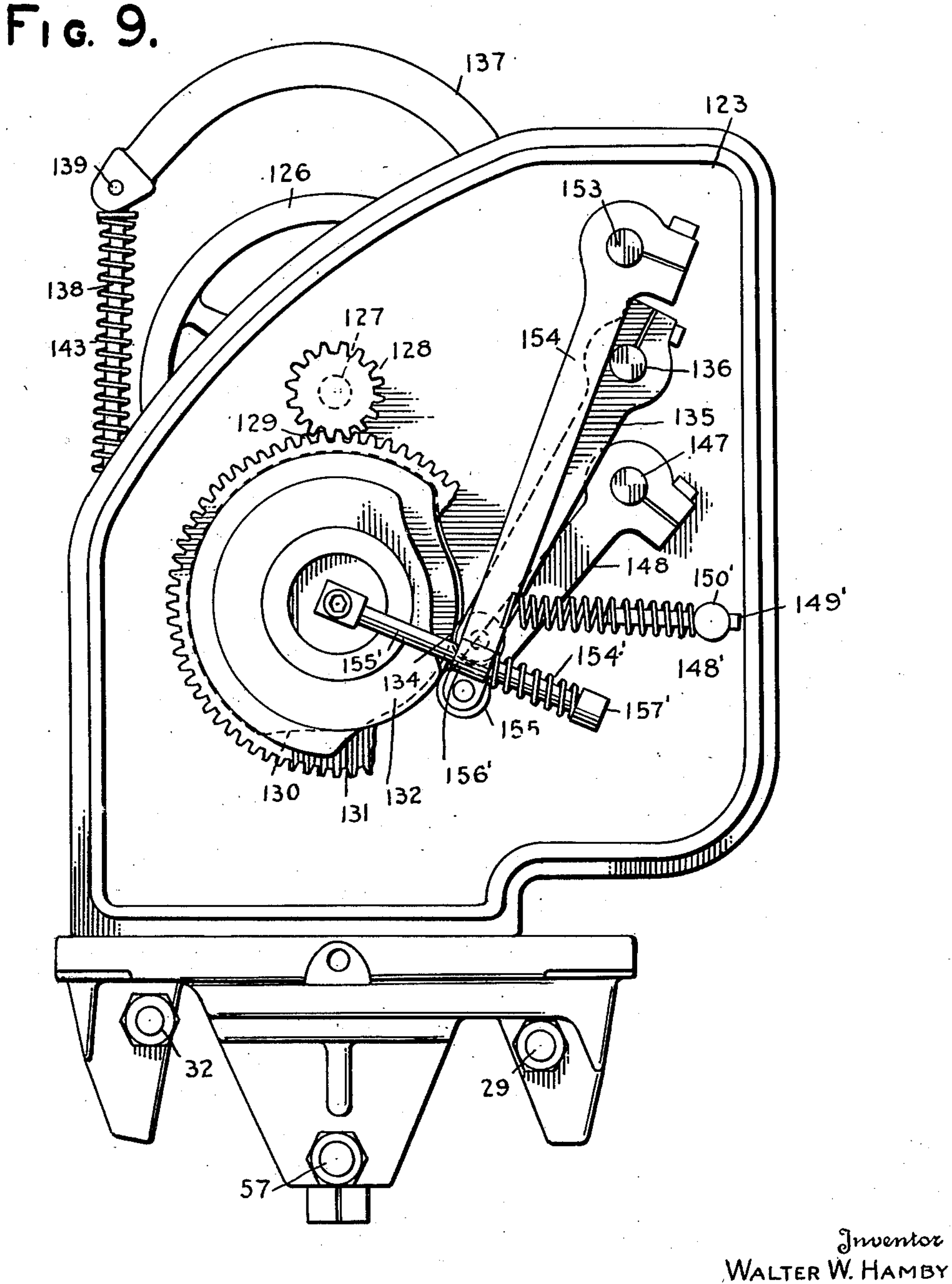
Figure 11:
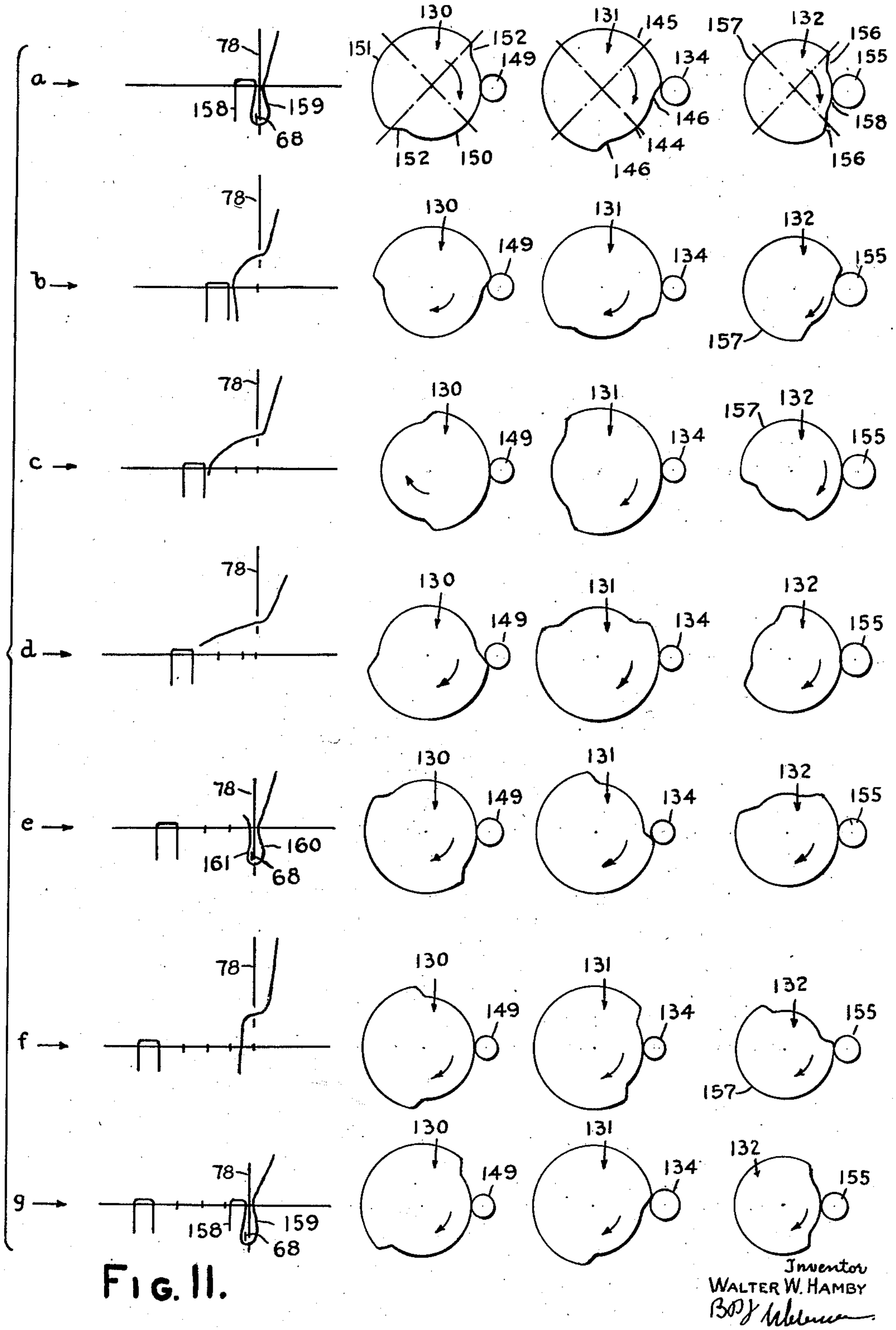

In the accompanying drawings, forming a part of this application, and in which like numerals are employed to designate like parts throughout the same, Figure 1 is a plan view of a machine embodying my invention, parts broken away, Figure 2 is a front side elevation of the same, Figure 3 is a rear side elevation of the same, Figure 4 is an elevation of the needle bar end of the machine, Figure 5 is a similar view, parts omitted, showing the needle bar raised and latched in the raised position, Figure 6 is a plan view of the same, Figure 7 is a horizontal section taken on line 7—7 of Figure 5, Figure 8 is a transverse vertical section taken on line 8—8 of Figure 1, the feed dog being dotted for the purpose of illustration, Figure 9 is an elevation of the driving end of the machine, Figure 10 is a side elevation of the machine, parts broken away to show certain operating elements, Figure 10*a* is a longitudinal section through the reciprocatory housing and latch, and, Figure 11 is a diagrammatic view showing the relative positions of the needle and cams.

The tufting machine comprises a horizontal flat base 20, upon which is rigidly mounted a stock 21, carrying an overhanging tubular arm 22, having a head 23 secured thereto.

The base 20 is equipped with the usual throat plate having an opening for the passage of the teeth 24 of the feed dog 25. One end of this feed dog is raised and lowered by a roller 26, operating within a slot 27. This roller is carried by a vertically swinging crank 28, rigidly mounted upon a rock shaft 29, suitably mounted beneath the base 20, as is well known. The opposite end of the feed dog 25 is pivotally connected, at 30, with a vertically swinging crank 31, rigidly mounted upon a rock shaft 32, arranged beneath the base 20 and suitably mounted thereon. The crank 31 serves to move the feed dog longitudinally, as it is raised and lowered. This is the conventional feed dog arrangement and no further description is thought to be necessary. The rock shaft 29, Figure 8, has a crank 33 rigidly connected therewith, pivotally connected at 34 with a connecting rod 35, extending upwardly and connected with an eccentric strap 36, engaging an eccentric 37 rigidly mounted upon a main drive shaft 38, suitably journaled within the arm 22. The companion rock shaft 32 has a vertically swinging crank 39 rigidly secured thereto, having a lever 40 pivotally connected therewith, as shown at 41. This lever extends upwardly and is equipped with a fork 42, receiving the vertically sliding block 43, having a cylindrical opening for rotatably receiving an eccentric 44. This eccentric is rigidly mounted upon the main drive shaft 38. The lever 40 is pivotally mounted at 45 upon the upper end of a link 46, Figures 8 and 10, and this link is pivotally mounted at its lower end as shown at 47, upon a bell crank lever 48. This bell crank lever is mounted upon a fixed pivot 49. The bell crank lever has a rod 50 rigidly secured thereto extending to the exterior of the stock 21 through an opening 51. This rod carries a shock absorbing sleeve 52, formed of fiber, rubber or the like, and this sleeve is arranged between vertically adjustable stops or screws 53 and 54, carried by brackets 55 and 56 respectively, rigidly secured to the stock. When the bell crank lever 48 has its right end, Figure 8, swung upwardly, its opposite end is swung downwardly and the link 46 is lowered, which results in lowering the pivot 45 of the lever 40. This increases the distance between the pivot 45 and the center of the eccentric 44, with the result that the longitudinal movement of the lever 40 caused by the eccentric 44 is reduced and the feed dog has a shortened throw. The stop 53 limits the upward movement of the rod 50 and by this means the shortened throw of the feed dog may be limited or adjusted. When the rod 50 is moved downwardly, the pivot 45 is moved upwardly and the lever 40 moves longitudinally for an increased distance by the action of the eccentric 44, whereby the feed dog has its throw lengthened. The sleeve 52 engages the stop 54 and by adjusting the stop 54 the lengthened throw of the feed dog may be regulated. The bell crank lever 48 and its connection with the lever 40 to regulate its movement, is conventional, but I have improved upon this construction by providing the adjustable stops 55 and 56, and the automatic means to move the rod 50, as will be described.

Arranged beneath the base 20 is a central rock shaft 57, suitably mounted upon the base 20. This rock shaft has a vertical lever 58 rigidly mounted thereon and this lever has pivotal connection at its upper end, at 59, with a link 60, pivotally connected with a crank 61 formed upon the shaft 38. The central rock shaft 57 has a crank 62 rigidly secured thereto, pivotally connected with a link 63, at 64, and this link 63 is pivoted at 65 with a crank 66, rigidly secured to an auxiliary rock shaft 67. This rock shaft 67 is suitably mounted upon the base 20. The numeral 68 designates a looper, the hook of which faces in the opposite direction to the feed of the work and preferably has a down-turned end. This looper is rigidly mounted upon a looper staff 69, carried by a clamp 70, adjustably rigidly mounted upon the rock shaft 57. A cutter or hacksaw 71 is provided, and is carried by an adjustable clamp 72, mounted upon the rock shaft 67. This cutter has shearing action with the looper to sever the loops as they are formed thereon.

The numeral 73 designates a presserfoot, carried by a presserfoot bar 74, which may be raised and lowered in the conventional manner by a lever 75, Figure 1. This presserfoot may also be raised by a lever 76.

The numeral 77 designates the needle bar, carrying the needle 78. This needle bar reciprocates within guides 79 and 80. Means are provided to reciprocate the needle bar and then hold it against movement at the elevated position. This means comprises a latch housing 81, slidably mounted upon the needle bar. This latch housing comprises sides 82, having a block 83 rigidly secured to the sides 82 at their upper ends and a sleeve 84 rigidly secured to the sides 82 at their lower ends. The block 83 has an opening which slidably receives the needle bar 77 and the sleeve 84 also slidably receives this needle bar. A block 85 is rigidly secured to the needle bar 77 and is adapted to engage with a shock absorbing washer 86 formed of leather, rubber, or the like. The needle bar 77 has a block 87 rigidly mounted thereon, arranged between the sides 82 and above the sleeve 84. The sides 82 are provided with apertured knuckles 88, receiving a pivot 89, connected with a latch 90, operating between the sides 82, and the lower end of this latch engages over the block 87. When the latch 90 is in the inner or projected position, it engages block 87 and the downward movement of the housing 81 will move the needle bar 77 downwardly and when the housing moves upwardly, it raises the needle bar since the sleeve 84 contacts with the block 87, hence when the latch 90 is in the projected position the housing 81 and needle bar 77 reciprocate as a unit. When the latch 90 is retracted, and the housing 81 moves downwardly, such housing will not move the needle bar downwardly. The sleeve 84 has a pin 91 rigidly secured thereto, which is pivotally connected with a link 92, in turn pivotally connected at 93 with a cam crank 94, rigidly mounted upon the drive shaft 38. It is obvious that the housing 81 is continuously reciprocated during the rotation of the drive shaft.

Arranged near the upper end of the head 23 is a horizontal rod 95, the free end of which is slidable within an apertured knuckle 96 formed upon a head plate 97, which is rigidly secured to the head 23 by screws 98. The rod 95 is urged to the left, Figure 4, by a compressible coil spring 99, surrounding the same and engaging a washer 100 and the apertured knuckle 96. The opposite end of the rod 95 is connected with a coupling block 101, which is pivoted at 102 to an upstanding crank 103. Rigidly secured to the rod 95 is a rod 104, Figures 4, 5 and 6, and one end of this rod is bent to provide a horizontal finger 105, the free end of which is preferably beveled, and this finger is adapted to be moved beneath the block 85, into and out of the path of travel of the same. The rod 104 is bent to provide a depending portion 106, which extends through an apertured arm 90', rigidly secured to the pivoted latch 90 and projecting laterally therefrom. The spring 99 moves the latch 90 to the closed position for locking housing 81 to the needle bar 77, and when the rod 95 is moved to the right, Figure 4, finger 105 engages beneath the block 85, thereby holding the needle bar 77 elevated while extension 106 moves the latch 90 to the retracted or released position.

I provide a yarn clamp which is mounted upon the needle bar, for reciprocation therewith, Figures 2, 4, 6 and 7. This yarn clamp comprises a block 107, rigidly secured to the needle bar by a set screw 108. This block provides a stationary jaw 109, Figure 7. Projecting laterally from the block 107 are apertured knuckles 110, between which is arranged one end of a pivoted jaw 111, connected therewith by a pivot 112. The jaw 111 also passes between lateral projecting knuckles 113 and is guided thereby. At its free end the jaw 111 has a slot 114, receiving a vertical extension 115 of a horizontal rod 116. One end of this rod is slidable within a fixed apertured knuckle 117. The rod 116 has a flat head 118, provided with a slot 119. A spring 120 surrounds the rod 116 and engages between the head 118 and the apertured knuckle 117 and shifts the rod 116 to the left, Figure 4, thereby closing the jaw 111. The head 118 is mounted within a forked head 121, Figures 3 and 4, carried by the lower end of a vertically swinging lever 122, and a pin 121' enters the slot 119.

Disposed at the driving end of the tubular arm 22, see more particularly Figures 2 and 9, is a vertical plate 123, rigidly secured to the base 20 by brackets 124 or the like. The main drive shaft 38 is equipped with the usual grooved pulley 125 and hand wheel 126. A shaft 127 extends through an opening in the plate 123 and is suitably connected with the end of the main drive shaft 38 for rotation therewith. This shaft 127 carries a gear 128, rotatable therewith, and the gear 128 is in permanent mesh with a larger gear 129, included in a cam unit. The ratio between the gears 127 and 129 is four to one, as shown. The cam unit is integral and includes an inner cam 130, which operates the needle bar latch, an intermediate cam 131, which operates the feed dog adjustment, and an outer cam 132 which operates the yarn clamp. This cam unit is rotatably mounted upon a horizontal shaft 133, rigidly secured to the vertical plate 123. The intermediate cam 131 is engaged by a roller 134, carried by a crank 135, rigidly mounted upon a rock shaft 136, suitably journaled in the plates 97 and 123. The horizontal rock shaft has a curved arm 137 rigidly secured thereto and this arm extends over the tubular arm 22, Figures 2, 3 and 8. As more clearly shown in Figure 8, a vertical rod 138 is pivotally connected with the free end of the arm 137, at 139, and the lower end of this rod passes through a slot in a flat head 140, rigidly secured to the outer end of the rod 50. Arranged beneath the head 140 is a collar 141, adjustable upon the rod 138 and held in place by a set screw 142. A collapsible coil spring 143 surrounds the rod 138 and is confined between the end of the arm 137 and the head 140. When the free end of the arm 137 is swung downwardly, the action of the spring 143 swings the rod 50 downwardly, and when the free end of the arm 137 is raised the rod 138 raises the rod 50. The cam 131 has a low concentric part 144 and a high concentric part 145, and inclined parts 146. The low part 144 is one-fourth of the degrees of the complete cam, and the high part 145 three-fourths of the degrees of the complete cam, half of the inclined portions 146 being regarded as portions of the low and high parts. This arrangement of the low and high parts has been found to operate satisfactorily, although it may be somewhat varied. When the roller 134 travels upon the low part 144, the arm 137 has its free end raised, and this action will swing the bell crank lever 48 upon its pivot 49 and the pivot 45 of the lever 40 is lowered and this will reduce the length of the feed stroke of the dog and effect a short feeding movement which occurs between the legs of the U-shaped tuft. When the roller 134 travels upon the high part 145, the reverse of this action occurs and the effective stroke of the feed dog is increased, and this occurs for three effective feed movements of the feed dog. This causes the distance between the formed U-shaped tufts to be increased.

The crank 103 is rigidly mounted upon a lower rock shaft 147, suitably journaled upon the vertical plates 97 and 123, and a crank 148, Figure 9, is rigidly mounted upon the rock shaft 147 and carries a roller 149 at its lower end. The crank 148 has its lower end moved toward its cam by a collapsible coil spring 148' carried by a pin 149' secured to a stationary post 150.' This roller 149 is arranged to engage the inner cam 130. The cam 130 has a low concentric part 150 and a high concentric part 151, and inclined parts 152. The low part 150 is one-half of the degrees of the complete cam and the high 151 is one-half of the degrees of the complete cam, the high and low parts being regarded as including half of the inclined parts 152. When the roller 149 engages the low part 150 of the cam 130, the rod 95 is moved to the left, Figure 4, and the finger 105 is moved from beneath the block 85 and at the same time the depending portion 106 of the rod swings the latch 90 inwardly to engage above the block 87. The needle bar 77 is now locked to the reciprocatory housing 82 and the drive shaft will reciprocate the needle bar for the sewing period, through two revolutions of the main drive shaft 38. The roller 149 then travels upon the high part 151 of the cam and this roller reaches the high part of the cam when the needle bar 77 is in the uppermost position. The crank 103 is now swung to the right, Figure 4, the finger 105 positioned beneath the block 85, and the rod extension 106 shifted to the right, and the latch 90 moved from above and out of engagement with the block 87. The needle bar 77 is now held in the elevated position during the next two revolutions of the shaft 38.

The crank 122, Figure 4, is rigidly mounted upon an upper rock shaft 153, suitably journaled upon the plates 97 and 123. The opposite end of the shaft 153, Figure 9, has a depending crank 154 rigidly mounted thereon, and this crank 154 carries a roller 155 at its lower end and this roller 155 engages the outer cam 132. The crank 154 is moved toward its cam by a spring 154', carried by a rod 155', secured to the stationary shaft 133. The crank 154 has a sleeve 156' rigidly secured thereto and this sleeve is urged inwardly by the spring 154' engaging the head 157' carried by the rod 155'. The cam 132 has a low concentric part 156 and a high concentric part 157 and inclined parts 158. The low part 156 has one-fourth the degrees of the entire cam and the high part 157 has three-fourths the degrees of the entire cam, the high and low parts including half of the inclined parts 158. When the roller 155 passes upon the low part 155, the crank 122 is swung to the right, Figure 4, and rod 116 moves to the right, and the pivoted jaw 111 is swung to the open position to release the yarn. This occurs when the needle bar is at the top position and the latch 90 is in holding engagement with the block 87. The yarn clamp remains in the unlatched condition throughout one revolution of the main drive shaft 38, and the end of this revolution is reached when the needle has descended and penetrated the fabric and returned to the next top position. When the needle reaches the second top position the roller 155 engages the high part 157 of the cam and the yarn clamp is again rendered active, so that the jaw 111 has clamping engagement with the yarn. The jaw 111 remains in clamping engagement with the yarn for three revolutions of the main drive shaft 38.

The yarn 160 passes through a stationary yarn guide 161, mounted upon the head of the machine, and through a yarn jerker 162 and a yarn tension 163, both of which are mounted upon the needle bar 77, for reciprocation therewith.

In connection with the operation of the machine, attention is called to Figure 11, in which the needle is shown in various positions, during the operation of the machine, and the three cams are arranged in a group near the needle in each position, to show the relative positions of the cam with respect to the needle in such positions. The starting of the operation will be considered with the formation of the U-shaped tuft 158 and the loop 159 and the severing of the loop, Figure 11, *a*. The needle, Figure 11, *a*, is in the lowered position and the housing is locked to the needle bar. Figure 11, *b*, the housing and needle bar have moved to the top position, and when the needle reaches the top position, the needle bar is locked in the raised position, and the latch disconnects the needle bar from the reciprocatory housing, the yarn clamp closes and clamps the yarn, and the loop 159 is severed. In Figure 11, *a*, the roller 149 is engaging the low part 150 of the cam 130. When the needle reaches the raised position, Figure 11, *b*, the roller 149 has passed upon the high part 151 of the cam 130 and the needle bar is thereby locked in the raised position and disconnected from the reciprocatory housing. The roller 134 moved upon the inclined portion 146 of the cam 131 when the needle was in the fabric, Figure 11, *a*, and when the needle begins to rise and before it passes out of the fabric, the roller 134 moves upon the high part 145 of the cam 131. The arm 137 is now swung downwardly and the pivot 45 raised whereby the throw of the feed dog is increased. The roller 134 remains upon the high part of the cam 131 during the spacing period and while the main drive shaft 38 is making three revolutions. When the needle is in the raised position, Figure 11, *b*, and locked in this position and disconnected from the reciprocatory housing, and when the housing moves down slightly, the roller 155 passes upon the high part 157 of the cam 132 and the yarn clamp is closed to clamp the yarn. Particular attention is called to the fact that the length of the yarn between the closed yarn clamp and the free end of the yarn, remains constant until the yarn clamp is again opened. The roller 155 remains in engagement with the high part 157 of the cam 132 during three revolutions of the drive shaft 38 during the spacing period. This is shown in Figure 11, *c*. In Figure 11, *d*, the housing has moved up upon its third cycle, and the fabric has been fed two and one-half spaces. When the needle moves down and before it reaches and penetrates the fabric, the formed tuft has been fed three spaces from the line of the needle, Figure 11, *e*. When the needle was in the raised position, Figure 11, *d*, and before it started on the down stroke, Figure 11, *e*, the roller 149 passed the high part 151 of the cam 130 and engaged the low part 150 of this cam. When the needle, Figure 11, *e*, was in the low position and penetrating the fabric, the roller 134 passed upon the low part 144 of the cam 131, and the arm 137 was raised and the pivot 45 was lowered, thus providing a short feed by the feed dog. The roller 155 is still engaging the high part 157 of cam 132 when the needle is in the lowered position, Figure 11, *e*. This needle forms a loop 160, Figure 11, *e*, and one side 161 of which has its free end projecting above the fabric. The looper now enters this loop 160 when the needle rises, Figure 11, *f*, and the free end of the loop is slid about the looper and extends entirely beneath the fabric and such free end is level with the cutting edge of the looper. The yarn clamp remains closed until the needle reaches the extreme top position, and since the length of the yarn between the yarn clamp and its free end remains constant, and the stroke of the needle is constant, the length of the yarn beneath the fabric necessarily remains constant. When the needle was penetrating the fabric, Figure 11, *e*, the roller 134 was engaging the low part 144 of the cam 131, so that when the needle was elevated above the fabric, Figure 11, *f*, and again travel down toward the fabric and before it penetrated the fabric, the fabric was fed one short step. This reduces the distance between the legs of the U-shaped tuft. As soon as the needle reaches the top position, Figure 11, *f*, and as soon as the needle starts on its down stroke, the roller 155 engages the lower part 156 of the cam 132 and the yarn clamp releases the yarn. The short feed of the fabric is completed before the needle penetrates the fabric and the needle again passes downwardly through the fabric, completing the U-shaped tuft 158 and forming the next U-shaped loop 159, Figure 11, *g*. This completes the cycle of operation. When the needle moves up from the position shown in Figure 11, *g* or *a*, to the position shown at Figure 11, *b*, with the yarn clamp open, the frictional engagement of the two sides of the U-shaped loop 158 with the fabric and the loop 159 with the looper is greater than the frictional engagement between the yarn and the eye of the needle and the yarn tension, and this eliminates any tendency for the U-shaped tuft 158 being pulled in the fabric so that its ends will become uneven. The loop 159 is severed when the needle is at the top, the clamp is holding the yarn, and the housing is unlatched from the needle bar and is moving downwardly. Important features of the invention are that the yarn clamp maintains the length of the yarn between the clamp and the free end of the yarn constant, and the distance that the eye of the needle travels above the fabric is maintained substantially equal to the distance that such eye passes beneath the fabric.

While the machine has been shown as forming spaced single U-shaped tufts, the invention is not restricted to this feature, as slight changes can be made in the gear ratio between the main drift shaft and the cam unit, and in the shape of the cams 130, 131 and 132, whereby spaced groups of U-shaped tufts may be formed upon the fabric. When this is done, the same operation is practiced in forming the leading side of the leading U-shaped tuft and the trailing side of the trailing U-shaped tuft, in the group, as was practiced in forming the leading and trailing sides of the individual U-shaped tufts. I also contemplate making changes in the machine whereby the U-shaped tufts are not spaced but form a continuous line of tufting, and when this is done the skipping period will occur at the trailing end of the line of tufting and this will sever the trailing loop and free the work from the machine. Where a plurality of U-shaped tufts are formed in a group or a continuous line of U-shaped tufts are formed, the cutter may be so adjusted that one unsevered loop remains upon the looper until the end of the group or the end of the continuous line of tufts is reached and the skipping period is started, at which time all loops upon the looper are severed to free the work.

It is to be understood that the form of my invention herewith shown and described is to be taken as a preferred example of the same, and that various changes in the shape, size and arrangement of parts may be resorted to, without departing from the spirit of my invention or the scope of the subjoined claims.

Having thus described my invention, I claim:

1. The method of forming spaced U-shaped tufts upon a fabric, comprising holding a yarn in the eye of a needle and extending the free end of the yarn for a selected distance from such eye, positively clamping the yarn at one point so that the yarn cannot move longitudinally with relation to such point and causing the point of clamping to move with the needle and thereby causing the length of the yarn between the point of clamping and its free end to remain constant, passing the needle downwardly through the fabric while continuing said positive clamping action of the yarn to form the sides of a U-shaped loop upon the bottom of the fabric, moving a looper into the loop, moving the point of the needle upwardly above the fabric for a distance equal to the distance that the point of the needle was moved beneath the fabric while continuing said positive clamping action upon the yarn until the needle reaches the end of its upstroke and thereby causing the formed loop to slide about the looper and destroying the formed loop and leaving one side of the formed loop beneath the fabric, effecting a feed of the fabric while the needle is in the raised position, moving the needle downwardly toward the fabric and removing said positive clamping action from the yarn before the point of the needle reaches the fabric so that the yarn may freely shift longitudinally within the eye of the needle and continuing the downward movement of the needle through the fabric to complete the U-shaped tuft and form a second loop including one side of the formed U-shaped tuft, moving a looper into the second loop, continuing the removal of the positive clamping action from the yarn while moving the needle upwardly to a point above the fabric for the same distance that the point of the needle was moved downwardly below the fabric, severing the second loop while the needle is in the raised position, again applying said positive clamping action to the yarn when the needle is in the raised position, feeding the fabric while the needle is in the raised position to produce the space between the tufts, and repeating the operation to form a plurality of tufts.

2. The method of forming spaced U-shaped tufts upon a fabric, comprising holding a yarn in the eye of a needle and extending the free end of the yarn for a selected distance from such eye, positively clamping the yarn at one point so that the yarn cannot move longitudinally with relation to such point and causing the point of clamping to move with the needle and thereby causing the length of the yarn between the point of clamping and its free end to remain constant, passing the needle downwardly through the fabric while continuing said positive clamping action of the yarn to form the sides of a U-shaped loop upon the bottom of the fabric, moving a looper into a position inwardly of one side of the U-shaped loop, moving the point of the needle upwardly above the fabric while continuing said positive clamping action upon the yarn until the needle reaches the end of its upstroke and thereby causing the formed loop to slide about the looper and destroying the formed loop and leaving one side of the formed loop beneath the fabric, effecting a feed of the fabric while the needle is in the raised position, moving the needle downwardly toward the fabric and removing said positive clamping action from the yarn before the point of the needle reaches the fabric so that the yarn may freely slide within the eye of the needle and continuing the downward movement of the needle through the fabric to complete the U-shaped tuft and form a second loop including one side of the formed U-shaped tuft, moving a looper into the second loop, continuing the removal of the positive clamping action from the yarn while moving the needle upwardly to a point above the fabric and severing the second lop.

WALTER W. HAMBY.

REFERENCES CITED

The following references are of record in the file of this patent:

UNITED STATES PATENTS

| Number | Name | Date |
|---|---|---|
| 766,715 | Lyons | Aug. 2, 1904 |
| 1,382,976 | Hauser | June 28, 1921 |
| 2,171,825 | Bradwell | Sept. 5, 1939 |
| 2,218,123 | Smith | Oct. 15, 1940 |
| 2,346,467 | Bills et al. | Apr. 11, 1944 |
| 2,369,470 | Langa | Feb. 13, 1945 |